3,781,435
STEROID ANAESTHETICS
Benjamin Davis, Chalfont St. Peter, Derek Roger Pearce, Bracknell, and Gordon Hanley Phillipps, Wembley, England, assignors to Glaxo Laboratories Limited, Greenford, Middlesex, England
No Drawing. Original application June 17, 1970, Ser. No. 47,163, now Patent No. 3,714,352, dated Jan. 30, 1973. Divided and this application Jan. 5, 1973, Ser. No. 321,274
Claims priority, application Great Britain, June 20, 1969, 31,371/69
Int. Cl. A61k 17/00
U.S. Cl. 424—239  37 Claims

ABSTRACT OF THE DISCLOSURE

There are disclosed anaesthetic compositions for parenteral administration comprising an aqueous solution containing at least 1 mg./ml. of 3α-hydroxy-5α-pregnane-11,20-dione, at least 1% by weight of a non-ionic surfactant, and as solubility promoter a 3α-hydroxy-5α-pregnane-11,20-dione having at the 21-position a lower alkanoyloxy, hemisuccinyloxy or benzoyloxy group.

---

This application is a division of copending application Ser. No. 47,163 filed June 17, 1970, now U.S. Pat. No. 3,714,352 dated January 30, 1973.

This invention is concerned with improvements in or relating to pharmaceutical preparations having anaesthetic activity, and more particularly aqueous preparations suitable for intravenous injection.

It has long been known that a number of steroids give rise to profound depression of the central nervous system and act pharmacodynamically as anaesthetics or hypnotics. Such compounds have been the subject of considerable study in an attempt to find anaesthetics to replace such substances as thiopental sodium normally used but well known to be accompanied by some degree of hazard or disadvantage. The literature shows that very many steroid compounds have been studied in this regard. Reviews and discussions of some of the work carried out are to be found, for example, in "Methods in Hormone Research" (edited by Ralph I. Dorfman, vol. III, part A, Academic Press, London and New York 1964, pages 415–475); H. Witzel, Z Vitamin Hormon-Fermentforsch 1959, 10, 46–74; H. Selye, Endocrinology, 1942, 30, 437–453; S. K. Figdor et al., J. Pharmacol. Exptl. Therap., 1957, 119, 299–309 and Atkinson et al., J. Med. Chem. 1965, 8, 426–432.

It is stated in the Atkinson et al. paper that 3α-hydroxy-5α-pregnane-11,20-dione and its succinate have approximately the same hypnotic activity as each other and their 5β-epimers. The 5β-epimer, named "Predione," is described in French Pat. No. 6555M, dated Dec. 23, 1968, as an anaesthetic for intravenous injection in the form of an aqueous solution wherein it is solubilized by agents including Tween and Emulphor. This 5β-epimer is reported by Kappas et al., A.M.A. Arch. Intern. Med., 105, pages 701–708 (1960) as causing pyrexia in man by both the intramuscular and intravenous routes.

A thorough review of the literature indicates that anaesthetic steroids generally possess poor activity and/or long induction periods. With such compounds a variety of undesired side effects such as paraesthesia and thrombophlebitis and vein damage have been noted. Many steroid compounds having anaesthetic action are also of poor solubility and thus much research has hitherto been directed to the introduction of solubilising groups into such steroids, e.g. by the formation of partial esters with di- or poly-basic acids; such work has hitherto not resulted in the discovery of a satisfactory anaesthetic steroid compound. Anaesthetic steroids are generally relatively simple pregnane derivatives, often hydroxylated in the 3-position, the general trend having been in the latter case to study 3β-hydroxy compounds in preference to 3α-hydroxy compounds.

As a result of prolonged study of numerous steroids exhibiting anaesthetic activity we have found that 3α-hydroxy - 5α - pregnane - 11,20 - dione (hereinafter called "steroid I") has quite remarkable properties as an anaesthetic. This substance has but poor solubility in water and although referred to in the above cited literature as having anaesthetic properties, has apparently been rejected by reason of its poor solubility and the difficulty to be anticipated in its use by intravenous administration arising therefrom.

We have found however that steroid I can be brought into aqueous solution with the aid of certain non-ionic surface active agents to yield solutions of a sufficient concentration for injection, the resulting solutions when injected showing excellent anaesthetic properties.

Thus the aqueous solutions of steroid I according to the invention induce anaesthesia and possess short induction periods, the anaesthetic action at suitable doses being indeed instantaneous; the solutions are thus excellent anaesthetics for inducing anaesthesia which is to be maintained e.g. by an inhalation anaesthetic such as ether, halothane, nitrous oxide, trichloroethylene etc. The solutions are however capable of maintaining anaesthesia and analgesia to a sufficient degree to enable various surgical operations to be conducted without the aid of an inhalation anaesthetic, the required degree of anaesthesia being maintained if necessary by repeated administration (or even continuous administration). Recovery from anaesthesia (where this is induced only by the solutions of this invention) is excellent, the patient exhibiting a feeling of well-being in distinction to the unpleasant after effects generally associated with conventional anaesthetics. Moreover, anaesthetic solutions in accordance with the invention in general give rise to none of the undesired side-effects hitherto associated with steroidal anaesthetics.

According to the invention therefore we provide pharmaceutical compositions suitable for use by parenteral administration, comprising an aqeuous solution of at least 1 mg./ml. of 3α-hydroxy-5α-pregnane-11,20-dione and at least 1% by weight of a parenterally acceptable nonionic surface active agent having an HLB value of from 9–18.

The non-ionic surface active agents used for the purpose of this invention are generally those of the water soluble type, preferably having an HLB value of at least about 12, advantageously at least about 13. Preferably the HLB value of the surface active agent is not greater than about 15. The surface active agent must naturally be one which is physiologically compatible, i.e. of itself give rise to no physiologically unacceptable side effects in the dosages employed in the intended species to be treated (man or animal). Surface active agents for use in accordance with the invention are for example to be found among the following non-ionic surfactants and classes of surfactants: Polyoxyethylated derivatives of fatty ($C_{12}$–$C_{20}$) glyceride oils, e.g. castor oil, containing from 35 to 45 oxyethylene groups, per mole of fatty oil. Polyoxyethylene ethers (containing from 10 to 30 oxyethylene groups) of long chain alcohols (containing for example from 12–18 carbon atoms).

Polyoxyethylene-polyoxypropylene ethers containing from 15 to 35 and from 15 to 30 oxyethylene and oxypropylene groups respectively. Polyoxyethylene ethers (containing from 6 to 12 oxyethylene groups) of alkyl phenols the alkyl groups of which preferably contain 6–10 carbon atoms.

Polyoxyethylated (containing from 15 to 30 oxyethylene groups) fatty acid (e.g. $C_{12\text{-}18}$) esters of sugar alcohol anhydrides e.g. sorbitan or mannitan. Long-chain (e.g. $C_{10-18}$) alkanoyl mono- and di-alkanolamides (the alkanol portions of which for example contain 1–5 C atoms) for example lauroyl mono- and di-ethanolamides. Polyethylene glycol esters (containing from 6 to 40 ethylene oxide units) of long chain fatty acids (containing for example 12–22 C atoms) e.g. polyethyleneglycol monooleate (containing for example 8 ethylene oxide units).

Examples of non-ionic surface active agents, of the foregoing types, useful in accordance with the invention include:

Cremophor EL, a polyoxyethylated castor oil containing about 40 ethyleneoxide units per triglyceride unit;

Tween 80, polyoxyethylene sorbitan monooleate containing about 20 ethylene oxide units;

Tween 60, polyoxyethylene sorbitan monostearate containing about 20 ethylene oxide units; and Tween 40, polyoxyethylene sorbitan monopalmitate containing about 20 ethyleneoxide units.

The expression "solutions" is used herein to denote liquids which have the appearance of true solutions and are thus optically clear and capable of passage, for example, through a micro-porous filter, irrespective of whether such solutions are true solutions in the classical chemical sense and irrespective of whether they are stable or metastable. Thus it may be that the steroid is associated with micelles. The solutions of this invention, irrespective of their precise physical nature, behave as true solutions for the practical purpose of intravenous injection.

We have further found that the total amount of anaesthetic steroid which may be dissolved in accordance with the invention may be substantially increased by the presence of a steroid of general formula

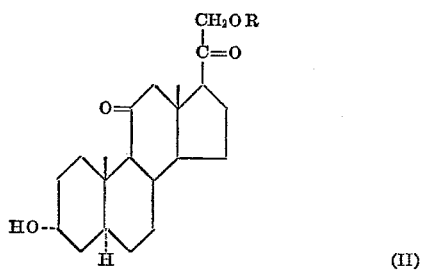

(II)

[wherein R is an alkanoyl group having a straight or branched chain (containing for example 2–4 carbon atoms which may, if desired be substituted, for example by a carboxyl group) or an unsubstituted or substituted aroyl or aralkanoyl group]. Such steroids of Formula II thus act as solubility promoters for the steroid I and are capable of substantially increasing the amount of the latter which may be dissolved in the compositions of this invention. Moreover steroids of Formula II, preferred members of which are those in which R is an acetyl, propionyl, isobutyryl, hemisuccinyl, or benzoyl group, themselves possess anaesthetic activity although of a generally lower order than steroid I. Solutions containing steroid I together with a steroid of Formula II may thus be prepared having a substantially greater anaesthetic potency than a solution of steroid I alone, due to the increased amount of steroid I which can be dissolved and the anaesthetic action of the steroid of Formula II per se.

Compounds of Formula II above are new compounds, and constitute a further feature of the invention.

The proportion of surface active agent to be used in the compositions of this invention depends upon its nature and upon the concentration of steroid desired in the final composition.

In preferred compositions according to the invention the proportion of surfactant is preferably at least 5%, by weight and advantageously above 10% by weight. A very convenient proportion of surfactant has been found to be 20% by weight but 30% and up to 50% may be used. The proportions of surfactant are expressed by weight in relation to the total volume of the composition in metric units.

The compositions according to this invention may contain up to 40 or even 50% by weight of the total steroid of a compound of Formula II; as little as 5% of the total steroid present of a compound of Formula II provides useful solubility promotion. For practical purposes it is preferred that of the total steroid at least 10% by weight, and preferably not more than 30% by weight of the total steroid consists of a compound of Formula II. Very satisfactory results have been achieved with a mixture of steroid I with a steroid of Formula II in which the proportion of the steroid of Formula II is about 25%.

As will be clear, the proportion of steroid I in the aqueous solution according to the invention depends upon the nature and amount of surface active agent used and also upon the amount of steroid of Formula II present (if used). The composition will contain at least 1 mg./ml. of steroid I and solutions can be made containing for example 2 and 4 mg./ml., using a steroid of Formula II as solubilizer the amounts of total steroid can be increased up to 50 mg./ml. although less than 30 mg./ml. total steroid and generally less than 20 mg./ml. will usually be satisfactory. A composition comprising 9 mg./ml. of steroid I to 3 mg./ml. of a compound of Formula II in which R is acetyl has been found to be very satisfactory.

In all cases, as stated above the relative proportion of the various components are adjusted to give a clear solution.

In a preferred method of preparing the solutions according to the invention the steroid is first dissolved in the selected surfactant, for example, with heating and the resulting solution dissolved in water. Alternatively the steroid may be dissolved in a volatile organic solvent advantageously having a boiling point of less than about 80° C. which is miscible with the surface active agent such as a volatile lower aliphatic ketone e.g. acetone or methyl ethyl ketone or a volatile halogenated hydrocarbon e.g. chloroform or methylene chloride. Acetone is particularly preferred for this purpose. The surface active agent is then added to this solution, the organic solvent removed by evaporation, for example by passing a stream of an inert gas through the solution e.g. nitrogen and the resulting solution of steroid in surfactant is mixed with water. By these procedures in general it is possible to dissolve increased amounts of steroid I as compared with other methods.

The solutions may also be prepared by shaking the steroid with an aqueous solution of the surface active agent.

In all cases simple tests enable one to determine the relative proportions of surface active agent required.

The anaesthetic solutions according to the invention are generally administered by intravenous injection although as is known in the anaesthetic art in certain cases, e.g. with young chlidren, intramuscular injection might be preferred.

As is usual in the case of anaesthetics, the quantity of steroid I used to induce anaesthesia depends upon the weight of the individual to be anaesthetised. For intravenous administration in the average man a dose of from 0.45 to 3.5 mg./kg. will in general be found to be satisfactory to induce anaesthesia, the preferred dose being within the range of from 0.7 to 2.5 mg./kg. Generally a dose of about 1.35 mg./kg. is very satisfactory. The dose will naturally vary to some extent dependent upon the physical condition of the patient, and the degree and period of anaesthesia required, all as is well known in the art. It is thus possible by adjustment of the dose to achieve durations of anaesthesia varying from about 10 minutes to up to an hour or more. If it is desired to maintain prolonged anaesthesia, repeated doses of the solutions of this inventory may be used, such repeated doses being generally either of the same order or lower than the original dose. Alternatively continuous administration may be undertaken at for example a rate of 0.09–1.8 mg./kg./min.

Where the anaesthetic solutions are administered intramuscularly, naturally higher doses are generally necessary.

3α-hydroxy-5α-pregnane-11,20-dione (steroid I) can be prepared in any convenient manner for example as described by Camerino et al., Helv. Chim. Acta, 1953, 36, 1945, or by Nagata et al., Helv. Chim. Acta, 1959, 42, 1399. In applying the last-mentioned process we have encountered various difficulties at several stages due to side reactions, which we have found to be due to epimerisation at position 17. As a result of further work we have developed a new synthesis of steroid I based essentially upon the synthesis of Nagata et al. but working essentially with intermediates having $\Delta^{16}$-unsaturation. Our new synthesis provides generally better yields and affords greater ease of working and purity of product, due essentially to the impossibility of epimerisation at position 17 in compounds of the $\Delta^{16}$ series.

Thus in accordance with our new synthesis 3α-hydroxy-5α-pregnane-11,20-dione is prepared by hydrogenation of 3α-hydroxy-5α-pregn-16-ene-11,20-dione.

The hydrogenation may be conveniently effected in an organic solvent, for example an alkanol or an ether e.g. methanol, ethanol, propanol, diethyl ether or tetrahydrofuran. A catalyst is preferably used to effect the hydrogenation for example palladised charcoal, Raney nickel, platinum catalysts and the like.

3α - hydroxy - 5α - pregn - 16 - ene - 11,20-dione may, for example, be prepared by solvolysis of the 3α-acyloxy group of a 3α-acyloxy-5α-pregn-16-ene-11,20-dione. The acyloxy group at the 3α-position may, for example, be a formyloxy, acetoxy, propionyloxy, butyryloxy or benzoyloxy group.

Advantageously, the solvolysis may be effected by hydrolysis, preferably under alkaline conditions although both acidic and alkaline hydrolyses may be used. The hydrolysis may, for example, be effected in the presence of a solvent such as an alkanol or an ether, e.g. methanol, ethanol, propanol, iso-propanol, butanol, t-butanol, diethylether, dioxan or tetrahydrofuran. The reaction may be effected at any convenient temperature, for example, at ambient temperature or an elevated temperature, advantageously at the boiling point of the solvent used. Suitable alkalis for the hydrolysis include, for example, alkali metal hydroxides e.g. sodium or potassium hydroxide.

The 3α-acyloxy-5α-pregn-16-ene-11,20-diones which may be used for the preparation of the corresponding 3α-hydroxy compound may, for example, be prepared from a corresponding 3β-hydrocarbonsulphonyloxy-5α-pregn-16-ene-11,20-dione e.g. 3β-tosyloxy-5α-pregn-16-ene-11,20-dione and this reaction will be seen to be an inversion reaction in which the configuration at position 3 is changed from β to α.

According to this method, the 3β-sulphonate may be reacted with the appropriate carboxylic acid in solution in a solvent medium to yield the desired 3α-acyloxy compound. This reaction is preferably effected in the presence of alkali metal ions it being convenient to use the carboxylic acid in the form of an alkali metal salt thereof e.g. the sodium or potassium salt. Suitable solvents include for example dimethylsulphoxide and N-alkylamide solvents, e.g. dimethylformamide and dimethylacetamide. Preferably the solvent is water miscible and contains water (for example up to 20%) which generally serves to accelerate the reaction. Advantageously the carboxylic acid is an aliphatic carboxylic acid, lower alkanoic acids being preferred, for example, formic, acetic, propionic or butyric acids or an aromatic carboxylic acid e.g. benzoic acid.

Preferred salts are the sodium and potassium salts. Generally favourable results are obtained by the use of potassium acetate. The solvent used may be the carboxylic acid itself or an anhydride thereof (provided that such acid or anhydride is liquid at the reaction temperature) alkali metal ions being provided by an alkali metal salt e.g. of the carboxylic acid. For example when using aqueous formic acid, alkali metal ions which may be present may, for example, be provided by an alkali metal formate or an alkali metal hydrogen carbonate e.g. potassium formate or potassium hydrogen carbonate. The inversion of the configuration of the substituent at the 3-position of the 5α-pregn-16-ene-11,20-dione may be effected at any convenient temperature, advantageously at an elevated temperature, suitable conditions being found by preliminary experiment.

An alternative method of converting the above-mentioned 3β-sulphonates to the corresponding 3α-hydroxy compounds involves treatment of the sulphonates under alkaline conditions using for example an alkali metal hydroxide, e.g. NaOH, in a polar solvent e.g. ethanol, methanol, dioxan etc.

The inversion of the configuration of the substituent from the 3β-position to the 3α-position may also be effected in the presence of dimethylformamide, or dimethylacetamide preferably in the presence of water e.g. analogous to the method described by Chang and Blickenstaff (J. Amer. Chem. Soc., 1958, 80, 2906), and Bharucha et al. (Can. J. Chem., 1956, 34, 982). This method when applied, for example, to the tosylate of 3β-hydroxy-5α-pregn-16-ene-11,20-dione produced the corresponding 3α-formate together with some of the corresponding free hydroxy compound. Dimethyl acetamide may also be used, preferably under aqueous conditions, to form the 3α-acetoxy compound by inversion.

3β-hydrocarbon sulphonyloxy-5α-pregn-16-ene - 11,20-diones may, for example, be prepared according to conventional methods. Thus the 3β-hydroxy compound may be reacted with a hydrocarbon sulphonyl halide, for example p-toluene sulphonyl chloride, preferably in the presence of a tertiary base e.g. pyridine, collidine, N-methyl morpholine etc., the tertiary base, if desired, also acting as solvent. The sulphonylation reaction may, for example, be effected a temperature of from —50 to 50° C., preferably 0 to 25° C.

In carrying out the process according to the invention for the preparation of 3α-hydroxy - 5α - pregnane-11,20-dione, good overall yields from 3β-hydroxy-5α-pregn-16-ene-11,20-dione may be obtained by the omission of purification of at least some of the intermediates. This process also has the advantage of comparative ease of purification of 3α-hydroxy-5α-pregnane-11,20-dione from the corresponding 3-desoxy compound formed as a by-product in the process from the corresponding 2,16-diene formed by elimination of the hydrocarbon sulphonyloxy group in the inversion step. Good overall yields from 3β-hydroxy-5α-pregnane-11,20-dione of high purity, may be achieved using potassium acetate in aqueous dimethylformamide in the inversion step. Improved results may be obtained by partial purification of the reactant used in the hydrogenation step.

3α-hydroxy - 5α - pregn-16-ene-11,20-dione may also be prepared by hydration of 5α-pregna-2,16-diene-11,20-dione which may be formed by the elimination of the hydrocarbon sulphonyloxy group from the corresponding 3β-hydrocarbon sulphonyloxy compound. The hydration may, for example, be effected by the reaction with a mercury compound, preferably under acid conditions to form an oxymercurial intermediate which is then decomposed by reduction. For example, the oxymercuration may be carried out using mercuric acetate, mercuric sulphate or mercuric oxide in a solvent such as dioxan or tetrahydrofuran (preferably aqueous) advantageously in the presence of a strong acid e.g. perchloric acid, nitric acid, or sulphuric acid. Decomposition of the oxymercurial intermediate may for example be effected by reduction with an alkali metal borohydride e.g. sodium or potassium borohydride, preferably in the presence of aqueous alkali e.g. aqueous caustic soda.

3β-hydroxy - 5α - pregn-16-ene,11,20-dione may be prepared from 3β-acetoxy-5α-pregn - 16 - ene-11,20-dione (Chamberlin et al., J. Amer. Chem. Soc., 1951, 73, 2396). Hydrolysis of the 3β-ocetoxy compound may be effected by conventional methods, for example under alkaline conditions, e.g. in solution in acetone, an alkanol or ether such as methanol, ethanol, propanol, t-butanol, diethyl ether, dioxan or tetrahydrofuran. Suitable alkalis may, for example, be alkali metal hydroxides e.g. potassium hydroxide.

Steroids of general Formula II above are new compounds and constitute another feature of the invention. The preferred compounds of Formula II for use as solubilizing agents in pharmaceutical preparations are those in which the 21-acyloxy group is a 21-acetoxy, 21-propionyloxy, 21-isobutyryloxy or 21-benzoyloxy group.

The 21-ocyloxy compounds of Formula II above may be prepared by any convenient method. We have found however that such compounds are advantageously prepared by reaction of a compound of formula

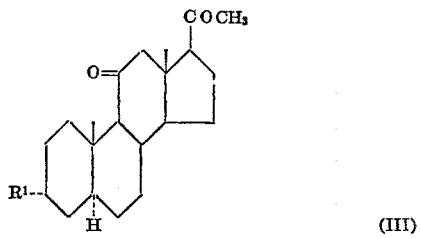

(III)

(in which R¹ represents a hydroxy or protected hydroxy group e.g. a nitrate, trimethylsilyloxy or trichloroethoxycarbonyloxy group) with a lead tetraacylate preferably in the presence of a Lewis acid, and, where R¹ represents a protected hydroxy group, subsequent conversion of said group to a hydroxy group. Protection of the 3α-hydroxy group of the compound of Formula III however, is not essential before the acyloxylation reaction.

The lead tetra-acylate used may be for example lead tetraacetate. The Lewis acid may for example be boron trifluoride, conveniently used as its etherate. We have found, for example that the presence of boron trifluoride improves the rate of reaction and can enable lower temperatures of reaction to be employed, thus, in many cases, the reaction proceeds satisfactorily at ambient temperature, i.e. in the absence of applied heat.

The yield obtained by this process is frequently better than that obtained at an elevated temperature in the absence of boron trifluoride and the fact that the reaction rate is faster and thus lower temperatures can often be used means that this process possesses economic advantages on the large scale. The ability to operate at lower temperatures also means that there may be less likelihood of undesired side reactions taking place.

The acyloxylation of compounds of the Formula III may be carried out in a solvent medium comprising a mixture of a hydrocarbon solvent and an alcohol. Suitable hydrocarbon solvents are, for example, benzene or toluene and the alcohol may, for example, be methanol. Advantageously the solvent comprises a mixture of benzene and methanol in the ratio of 19:1.

The acyloxylation is especially suitable for acetoxylation using lead tetraacetate but other lead acylates, e.g. lead tetrapropionate may, of course, be used with the formation of the corresponding 21-propionyloxy compound.

The 3α-trimethylsilyloxy compounds of Formula III (R¹ representing a trimethylsilyloxy group) may, for example, be prepared by the reaction of the parent 3α-hydroxy compound of Formula III (R' representing a hydroxy group) with a trimethylsilyl halide e.g. trimethylchlorosilane or hexamethyl disilazane in the presence of a tertiary base e.g. pyridine and, if desired, in the presence of a solvent e.g. a halogenated hydrocarbon such as methylene chloride or tetrahydrofuran. The reaction may conveniently be effected at room temperature or if desired, at lower temperatures e.g. 0° C. The trimethylsilyloxy protecting group is generally automatically removed during the acyloxylation.

The 3α-trichloroethoxycarbonyloxy compound of Formula III may be prepared by reaction of the parent 3α-hydroxy compound with an alkylchloroformate, e.g. trichloroethyl chloroformate preferably in the presence of an acid binding agent e.g. a tertiary amine such as pyridine, conveniently in a solvent such as dioxane or tetrahydrofuran. The trichloroethoxy carbonyl protective group may subsequently be removed by reduction for example using a metal/acid system such as zinc and acetic acid.

The 3α-nitrate of Formula III may be prepared by reaction of the parent 3α-hydroxy compound with fuming nitric acid and acetic anhydride preferably in the presence of a solvent e.g. chloroform. The nitrate protection group may subsequently be removed by reduction, for example, using a metal acid system such as zinc and acetic acid or catalytic hydrogenation using for example, palladium on charcoal as catalyst.

Other methods for the preparation of the 21-acyloxy compounds of Formula II above may also be used. Thus a 21-acyloxy-5α-pregnane-3,11,20-trione may be reduced, for example, using an enzymatic method such as reduction with brewers yeast (Saccharomyces cerevisiae). This method is convenient for the preparation of 21-alkanoyloxy compounds such as the 21-acetoxy compound.

Compounds of Formula II may also be prepared via the corresponding 21-chloro, 21-bromo or 21-iodo compounds. We prefer to proceed via the 21-bromo intermediate which may be prepared from 5α-pregnan-3α-ol-11,20-dione. The bromination is effected for example using molecular bromine, in a solvent such as methanol or ethanol advantageously at a temperature of from −10 to +30° C. The reaction is preferably conducted in the presence of a catalyst such as acetyl chloride or hydrogen bromide in acetic acid. The 21-halogeno compound may then be converted into the desired 21-acyloxy compound by reaction with the salt of the corresponding carboxylic acid, such as an alkali metal salt e.g. the potassium salt or a tertiary amine salt conveniently N-methylmorpholine or N-ethylpiperidine or a trialkylammonium salt e.g. the triethylammonium salt. The reaction is preferably carried out in a solvent for example acetone or methanol, advantageously under anhydrous conditions.

An alternative method, particularly convenient for the preparation of compounds of the Formula II in which R is other than an acetyl group, comprises acylating a compound of formula

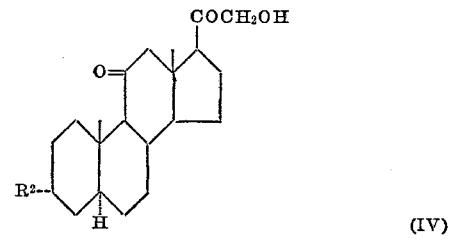

(IV)

(wherein R² represents a protected hydroxy group) and deprotecting the 3α-hydroxy group of the 21-acyloxy derivative of the compound of Formula IV produced. The compound of Formula IV is conveniently prepared by the deacylation of a 21-acyloxy derivative of a compound of Formula IV, for example a 21-acetoxy derivative thereof, and provides a method for converting one compound of Formula II for example in which R is acetyl to another compound of Formula II in which R is a different acyl group. The 21-acetyl compound of Formula II may thus, for example, be converted into another 21-acyl compound of Formula II by firstly protecting the 3α- hydroxy group with a protecting substituent which may be removed under acidic, reductive or other conditions but is stable under alkaline conditions, such as a 3α-ether substituent e.g. a tetrahydropyranyl or triphenylmethyl substituent or preferably a 3α-nitrate ester, hydrolysing the 3α-protected compound to yield the corresponding 21-hydroxy compound, under basic conditions, preferably in the presence of potassium or sodium hydrogen carbonate, conveniently in the presence of a solvent e.g. methanol, ethanol or tetrahydrofuran, reesterifying the resultant product and removing the 3α-protecting substituent.

The reesterification is preferably effected using the anhydride or chloride of the desired acid preferably in the presence of a tertiary amine (e.g. pyridine, collidine, or dimethylaniline) which may also serve as solvent for the reaction.

The protecting group at position 3 may be removed in conventional manner, conditions may be chosen which will not effect the rest of the molecule. Thus for example when the 3α-hydroxy group of the compound of Formula II is protected by the formation of a nitrate ester, the nitrate group may be removed by acid hydrolysis of the compound for example using aqueous mineral acid, or by reduction using, for example zinc and acetic acid or by catalytic hydrogenation using, for example, palladium on charcoal as catalyst.

The following examples are given by way of illustration only, all temperatures being in degrees centigrade.

EXAMPLE 1

3β-hydroxy-5α-pregn-16-ene-11,20-dione

A solution of 3β - acetoxy-5α-pregn-16-ene-11,20-dione (Chamberlin et al., J. Amer. Chem. Soc., 1951, 73, 2396) (25.7 g.) in dioxan (Analar, 500 ml.) was treated with potassium hydroxide (10 g.) and water 250 ml. and the mixture allowed to stand at room temperature for 1 hour. After a further 1 hour at 40° the mixture was diluted with water and the product filtered off. The crude material was dissolved in chloroform and filtered through a column of grade III neutral alumina (ca. 100 g.). The material obtained was crystallised from acetone-petroleum to give pure 3β-hydroxy-5α-pregn-16-ene - 11,20 - dione (17.65 g., 77.5%) as small plates, M.P. 217.5°, $[α]_D$ +82.9° (c. CHCl$_3$ 1.1), $λ_{max.}$ 234 nm. (ε 10,100) (Found (percent): C, 75.9; H, 9.3. $C_{21}H_{30}O_3$ requires (percent): C, 76.3; H, 9.2.)

EXAMPLE 2

3β-toluene-p-sulphonyloxy-5α-pregn-16-ene-11,20-dione

A solution of 3β-hydroxy-5α-pregn-16-ene-11,20-dione (39.6 g.) in dry pyridine (165 ml.) was treated with toluene-p-sulphonyl chloride (43.9 g.) to give the toluene sulphonate (56.7 g.), M.P. 147–151°. A portion (10.7 g.) of this material was crystallised from ethyl acetate-petroleum to give the pure toluenesulphonate (9.2 g.) as plates M.P. 154–155°, $[α]_D$ +42.8° (c., CHCl$_3$ 1.2), $λ_{max.}$ 226 nm. (ε 20,780) (Found (percent): C, 69.6; H, 7.4; S, 6.5. $C_{28}H_{36}O_5S$ requires (percent): C, 69.45; H, 7.5; S, 6.6.)

EXAMPLE 3

3α-hydroxy-5α-pregn-16-ene-11,20-dione

A solution of 3β - toluene-p-sulphonyloxy-5α-pregn-16-ene-11,20-dione (19.1 g.) in N,N-dimethylformamide (160 ml.) and water (16.0 ml.) was treated with potassium acetate (29.2 g.) and the mixture heated at 115° (complete solution on heating) for 2½ hours. The solvents were removed in vacuo and the residue partitioned between chloroform and water. The chloroform extract was washed with water, dried and evaporated. The residue was taken up in methanol (500 ml.) and the solution flushed with nitrogen. Potassium hydroxide (17 g.) in water (70 ml.) was added and the solution refluxed for 1 hour. Glacial acetic acid was added to bring the pH to about 6 and most of the methanol evaporated in vacuo. Dilution with water gave a gummy precipitate which was extracted into chloroform to give the crude product. This material was extracted with ether and the residue boiled with benzene. The insoluble material was crystallized from chloroform-petroleum to give 3α-hydroxy-5α-pregn-16-ene-11,20-dione (3.28 g.) as large prisms, M.P. 243–244°, $[α]_D$ +86.5° (c., CHCl$_3$ 0.8), $λ_{max.}$ 233 nm. (ε 9,530). (Found (percent): C, 76.6; H, 9.2. $C_{21}H_{30}O_3$ requires (percent): C, 76.3; H, 9.15.)

EXAMPLE 4

3α-hydroxy-5α-pregnane-11,20-dione from 3α-hydroxy-5α-pregn-16-ene-11,20-dione

A solution of 3α-hydroxy-5α-pregn-16-ene-11,20-dione (200 mg.) in freshly distilled tetrahydrofuran (8 ml.) with 5% palladium on carbon (100 mg.) was hydrogenated till hydrogen uptake ceased. The mixture was filtered through a pad of kieselguhr and the tetrahydrofuran removed in vacuo to give 3α-hydroxy-5α-pregnane-11,20-dione (196 mg.), M.P. 171–172°, $[α]_D$ +112.5° (c., CHCl$_3$ 1.0).

EXAMPLE 5

3α-hydroxy-5α-pregnane-11,20-dione

A solution of 3β-acetoxy-5α-pregn-16-ene-11,20-dione (50 g., 0.134 mole) in dioxan (1,050 ml.) was flushed with nitrogen and treated with potassium hydroxide (20 g., 0.356 mole) then nitrogen flushed water (535 ml.). The solution was stored at 40° for 1½ hours then at room temperature for 1 hour. Glacial acetic acid was added (to pH ca. 7), the organic solvent removed in vacuo until crystallization started and the resulting mixture diluted with water (ca. 1,500 ml.). The precipitated solid was filtered off, washed with water (until washings were neutral) and dried over phosphorus pentoxide in vacuo. This gave the alcohol (39.9 g., 90% theory) as an off-white crystalline solid, M.P. 216–218°, $[α]_D$ +82.9° (c. 1.0, CHCl$_3$), $λ_{max.}$ 234 nm. (ε 9,210).

An ice-cold solution of toluene-p-sulphonyl chloride (96 g., 0.505 mole) in dry pyridine (180 ml.) was added to an ice-cold solution of the above alcohol (86 g., 0.26 mole) in dry pyridine (180 ml.). The dark orange solution was allowed to warm to room temperature and kept at that temperature for 16 hours. The mixture was cooled to 0° and sufficient water (ca. 20 ml.) added to dissolve the precipitated pyridine hydrochloride. The clear solution was kept at room temperature for 2 hours then diluted with 2 N-hydrochloric acid (2.5 l.). The precipitated crystalline solid was filtered off, washed with 2 N-hydrochloric acid (500 ml.) then water (until washings were neutral) and dried in vacuo over phosphorus pentoxide to give the tosylate (120 g., 95%), M.P. 147–150° decomp., $[α]_D$ +38.6° (c. 1.0, CHCl$_3$).

A mixture of the tosylate (60 g.; 0.124 mole) in N,N-dimethylformamide (350 ml.) and potassium acetate (92 g., 0.94 mole) in water (35 ml.) was stirred at 115° for 4 hours. The brown solution was cooled and most of the N,N-dimethylformamide removed by evaporation at 50° and 4 mm. to give a brown solid mass. Another run with tosylate (58 g., 0.12 mole), potassium acetate (90 g., 0.91 mole), N,N-dimethylformamide (350 ml.) and water (35 ml.) was carried out as described above. The combined residues were shaken with chloroform, the chloroform layer separated and washed with more water (ca. 200 ml.). The combined aqueous fractions were extracted with chloroform (3× 100 ml.) and the combined chloroform extracts (including those above) were washed with water (3× 100 ml.) and dried over magnesium sulphate. The chloroform was removed in vacuo and residual N,N-dimethylformamide was evaporated at 50° and 4 mm. to give the crude 3α-acetate (92 g.) as a brown solid.

A solution of the crude acetate (92 g.) in dioxan (1,000 ml.) was mixed with a solution of potassium hydroxide (45 g., 0.8 mole) in water (500 ml.) to give a two-phase system. A homogeneous solution was obtained by the addition of dioxan (440 ml.) and water (625 ml.). Nitrogen was bubbled through the solution which was heated at 50° for 2 hours. The port colored solution was treated with glacial acetic acid (ca. 40 ml.) to bring the pH to about 7 and two thirds of the solvent was removed by distillation in vacuo (water pump). Water (ca. 3 l.) was added to the resultant mixture (which had already begun to crystallize) and the precipitated solid was filtered off, washed with water and dried over phosphorus pentoxide to give the crude 3α-alcohol (73.9 g.).

A solution of the above crude alcohol (73.8 g.) in tetrahydrofuran (1900 ml., freshly distilled) with 5% palladised charcoal (25 g.) was hydrogenated at atmospheric pressure and room temperature. After 1⅓ hours hydrogen uptake (ca. 71) ceased. The catalyst was filtered off on a kieselguhr pad and the filtrate was concentrated in vacuo to a crystalline mass (71.3 g.).

This material was dissolved in chloroform and filtered through a column of grade III neutral alumina (150 g.) which was washed with chloroform (total ca. 400 ml.). The chloroform was removed in vacuo and the residue taken up in acetone (200 ml.). Acetone (100 ml.) was boiled off and the solution was diluted (with stirring with pertoleum) (ca. 2 l.). The precipitated solid was collected by filtrration washed with petroleum and dried to give the crude alcohol (47.1 g.), M.P. 161–163°. Retreatment with acetone-petroleum gave material (38.3 g.), M.P. 165–168°, and a second crop (3.0 g.), M.P. 167–168°, as fine needles. A further treatment of these combined crops afforded purer material (33.8 g. plus a 5.3 g. second crop), M.P. 168–169° (97.2% pure on G.L.C., 45.5% yield based on 3β-alcohol). A final treatment gave 3α-hydroxy-5α-pregnane-11,20-dione (35 1. g., 40.8% yield based on 3β-alcohol; 46.7% yield based on 3β-acetate) as needles, M.P. 168–170°, $[\alpha]_D$ +111.6° (c. 1.0, CHCl$_3$). (Found (percent): C, 76.15; H, 9.6. Calcd. for $C_{21}H_{32}O_3$ (percent): C, 75.9; H, 9.7.) Purity by G.L.C. analysis was 97.7%.

Chromatography of the combined residues on grade III neutral alumina gave a further amount (9.3 g.) of 3α-hydroxy-5α-pregnane-11,20-dione.

EXAMPLES 6–16

The table records gas-liquid chromatographic analysis of mixtures of 3α-acetoxy (and/or formyloxy)-5α-pregn-16-ene-11,20-dione, 3α-hydroxy - 5α-pregn-16-ene-11,20-dione and 5α-pregn-2,16-diene-11,20-dione formed by solvolysis of 3β-toluene-p-suphonyloxy-5α-pregn-16-ene-11,20-dione.

room temperature for 24 hours, and then 3 M sodium hydroxide solution (3 ml.) and 0.5 M sodium borohydride in 3 M sodium hydroxide solution (about 3 ml.) were added until all the yellow complex had been reduced. The tetrahydrofuran layer was separated, washed with sodium chloride solution, and then diluted with ether (100 ml.). The organic solution was washed well with water, dried, and evaporated to give a white oily solid, which was purified by preparative thin-layer chromatography and recrystallization from ethyl acetate/petroleum to give 3α-hydroxy-5α-pregn-16-ene-11,20-dione (160 mg., 22%) as colourless crystals, M.P. and mixed M.P. with an authentic sample, 234–237°, $[\alpha]_D$ +86.5° (c. 1.1, CHCl$_3$).

EXAMPLE 18

21-acetoxy-3α-hydroxy-5α-pregnane-11,20-dione

Boron trifluoride etherate (37.9 ml.) was added to a stirred solution of 3α-hydroxy-5α-pregnane-11,20-dione (6.64 g., 20 mmole) and lead tetraacetate (10.1 g., 22 mmole) in dry benzene (280 ml.) and methanol (15.1 ml.) at room temperature. After 2 hours the mixture was poured into water (2 l.) and extracted with ether (1 l.). The combined ether extracts were washed successively with sodium bicarbonate solution and water, dried over magnesium sulphate, and concentrated in vacuo to give a white crystalline mass. Four recrystallizations from acetone-petroleum (B.P. 40–60°) gave 21-acetoxy-3α-hydroxy-5α-pregnane-11,20-dione as fine needles (4.22 g., 54%), M.P. 172–173°, $[\alpha]_D$ +104° (c. 1.0, CHCl$_3$). (Found (percent): C, 70.8; H, 8.9. $C_{23}H_{34}O_5$ requires (percent): C, 70.8; H, 8.8.)

EXAMPLE 19

21-acetoxy-3α-hydroxy-5α-pregnane-11,20-dione via a trimethylsilyl derivative

Trimethylchlorosilane (0.33 ml., 1.5 equiv.) and pyridine (0.485 ml., 2 equiv.) were added to a solution of 3α-hydroxy-5α-pregnane-11,20-dione (1.0 g.) in methylene chloride (16.6 ml.) at room temperature. After 16 hours at 0° more trimethylchlorosilane (0.33 ml., 1 equiv.) was added and after a further 1½ hour the solvent was removed in vacuo. Ether was added to the residue and the white solid was filtered off. The ether was removed in vacuo and the residue triturated with a little petroleum (B.P. 40–60°) to give 3α-trimethyl-siloxy-5α-pregnane-11,20-dione (0.2 g.), M.P. 95–96°. This compound was also prepared by the use of hexamethyldisilazane and trimethylchlorosilane in tetrahydrofuran.

The 21-acetoxylation was carried out as described in Example 18, one crystallization from acetone-petroleum (B.P. 40–60°) afforded the 21-acetate, M.P. 170–173°.

Displacement reactions on 3β-toluene-p-sulphonyloxy-5α-pregn-16-ene-11, 20-dione

| Example number: | Weight of tosylate (g.) | Solvent volume (ml.) | Other reactants (g.) | Time (hrs.) | Temp., °C. | Percent 3α-CH$_3$CO$_2$— plus 3α-HCO$_2$— | Percent 3α-OH | Total percent 3α-CH$_3$CO$_2$— plus 3α-OH | Percent Δ$^2$ |
|---|---|---|---|---|---|---|---|---|---|
| 6 | 0.56 | D.M.F., 10 | Li$_2$CO$_3$, 0.64 | 3 | 115 | 43.7 | 12.8 | 56.5 | 39.5 |
| 7 | 1.9 | D.M.F., 75, H$_2$O | | 46½<br>Then 5<br>Then 18¾ | 80<br>90<br>100 | 64.5 | 14.1 | 78.6 | 21.4 |
| 8 | 0.58 | D.M.F., 15, H$_2$O, 0.33 | | 3 | 115 | 52.3 | 20.5 | 72.8 | 27.2 |
| 9 | 0.532 | D.M.F., 15, H$_2$O, 1.2 | HCO$_2$K, 0.566 | 21<br>Then 5 | 80<br>90 | 27.3 | 39.4 | 66.7 | 19.7 |
| 10 | 0.532 | D.M.F., 15, H$_2$O, 1.2 | HCO$_2$K, 0.566 | 3 | 115 | 53.6 | 21.9 | 75.5 | 24.5 |
| 11 | 0.532 | D.M.F., 15, H$_2$O, 1.2 | HCO$_2$K, 0.566 | 3¾ | 100 | 53.7 | 17.8 | 71.5 | 28.5 |
| 12 | 0.532 | D.M.F., 15, H$_2$O, 1.2 | HCO$_2$K, 0.566 | 27¾ | 100 | 32.0 | 37.6 | 69.6 | 28.0 |
| 13 | 0.532 | D.M.F., 15, H$_2$O, 1.2 | KOAc 0.66 | 46½<br>Then 5 | 80<br>90 | 53.4 | 21.5 | 74.9 | 25.1 |
| 14 | 60.0 | D.M.F., 350, H$_2$O, 35 | KOAc, 92.0 | 4 | 115 | 59.7 | 14.7 | 74.4 | 23.7 |
| 15 | 0.532 | D.M.F., 15, H$_2$O, 1.2 | KOAc, 0.66 | 3 | 115 | 59.3 | 10.3 | 69.6 | 27.5 |
| 16 | 0.486 | HCO$_2$H, 20, H$_2$O, 2.5 | KHCO$_3$ 0.2 | 5½ | 100 | 44.1 | 1.9 | 46.0 | 49.6 |

EXAMPLE 17

3α-hydroxy-5α-pregn-16-ene-11,20-dione

5α-pregna-2,16-diene-11,20-dione (700 mg., 2.2 mmole) was dissolved in tetrahydrofuran (10 ml.), and water (4 ml.) was added. Mercuric acetate (700 mg., 2.2 mmole) was added to the stirred solution to give an immediate yellow precipitate. The reaction mixture was stirred at

EXAMPLE 20

21-acetoxy-3α-hydroxy-5α-pregnane-11,20-dione via a trichloroethoxycarbonyl derivative 2,2,2-trichloroethylchloroformate (1.1 ml.) was added to a cooled, stirred, solution of 3α-hydroxy-5α-pregnane- 11,20-dione (1.0 g.) in pyridine (0.74 ml.) and dioxan (5.6 ml.). After 10 minutes dilute hydrochloric acid (14.5 ml.) was added and the solution was heated at 100° for 30 minutes. The resulting oil crystallized on cooling to give 3α-(2,2,2-trichloroethoxycarboxyl)-5α-pregnane-11,20-dione (1.45 g.), M.P. 130–131°, [α]$_D$ +56° (c. 1.0, CHCl$_3$). (Found (percent): C, 56.0; H, 6.5; Cl, 21.1. C$_{23}$H$_{33}$Cl$_3$O$_5$ requires (percent): C, 55.6; H, 6.6 Cl 207.) ;

21-acetoxylation of this compound (0.5 g.), using the procedure described in Example 18 gave a syrupy residue that crystallized on the addition of ether and petroleum. Recrystallization from ether-petroleum (B.P. 40–60°) gave 21-acetoxy-3α-(2,2,2-trichloroethoxycarbonyloxy)-5α-pregnane-11,20-dione (0.325 g.), M.P. 143–146° (decomp), [α]$_D$ +75.2° (c. 1.0, CHCl$_3$). (Found (percent): C, 55.1; H, 6.0; Cl, 18.6. C$_{25}$H$_{35}$Cl$_3$O$_7$ requires (percent): C, 54.3; H, 6.4; Cl, 19.2.)

Removal of the 2,2,2-trichloroethoxycarbonyl group was effected by stirring a solution of the steroid (0.10 g.), in ethanol (2 ml.) and glacial acetic acid (2.5 ml.) for 5 hours with addition of zinc dust (0.3 g.) during this period. The solids were filtered off, washed with ethanol and the combined filtrate was reduced in volume in vacuo. Addition of water to the residual solution gave 21-acetoxy-3α-hydroxy-5α-pregnane-11,20-dione (0.036 g.), M.P. 168–172°.

EXAMPLE 21

21-acetoxy-5α-pregnan-3α-ol-11,20-dione

Dried yeast (*Saccharomyces cerevisiae*, 50 g.) was stirred at room temperature with tap water (2 l.) containing sucrose (200 g.) and di-ammonium hydrogen phosphate (4 g.). After two hours 21-acetoxy-5α-pregnane-3,11,20-trione (1 g.) (Mancara et al., J. Amer. Chem. Soc., 1955, 77 5669) in ethanol (100 ml.) was added. The fermentation was stirred at room temperature for a further 24 hours, the yeast was removed by filtration, partially dried at the pump and extracted with hot chloroform (4× 250 ml.). The extracts were shaken with the filtrate, washed with water, dried (Na$_2$SO$_4$) and evaporated to a brown gum (634 mg.). This was subjected to preparative thin-layer chromatography which yielded two pure substances. Of these the less polar was the starting material 21-acetoxy-5α-pregnane-3,11,20-trione (68 mg.); which was recrystallized from acetone/hexane as colorless needles, M.P. 169–172° [α]$_D$ +127.5° (c. 0.87, CHCl$_3$). Gas-liquid chromatography confirmed that this was identical with the starting material.

The more polar substance (70 mg.) was recrystallized from acetone/hexane to afford 21-acetoxy-5α-pregnan-3α - ol - 11,20 - dione (57 mg.) as colorless needles, M.P. 179–182° [α]$_D$ +107° (c., 1.09 CHCl$_3$). Gas-liquid chromatography confirmed the identity of this material.

EXAMPLE 22

21-acetoxy-5α-pregnan-3α-ol-11,20-dione (a) 21-bromo-5α-pregnan-3α-ol-11,20-dione: 5α-pregnan-3α-ol-11,20-dione (1 g., 3 mmoles) in stirred methanol (7 ml.) at 30° was treated with acetyl chloride (1 drop). After two minutes bromine (0.19 ml., 3.52 mmoles) in methanol (4.5 ml.) was added dropwise, the solution being allowed to decolorize between the addition of each drop. The resulting clear solution was poured into chloroform (100 ml.), washed with water (3× 50 ml.), dried (Na$_2$SO$_4$) and evaporated to a white froth (1.40 g.). Preparative thin-layer chromatography afforded 21-bromo-5α-pregnan-3α-ol-11,20-dione (715 mg.) which crystallized from chloroform/ether as clusters of colorless needles, M.P. 160–162°, [α]$_D$ +109° (c. 0.82, CHCl$_3$). (Found (percent): C, 61.0; H, 7.9; Br, 19.7. C$_{21}$H$_{31}$BrO$_3$ requires (percent): C, 61.3; H, 7.6; Br, 19.45.)

A second, unstable substance (415 mg.) isolated from this reaction was examined spectroscopically and identified as 17α-bromo-5α-pregnan-3α-ol-11,20-dione.

(b) 21 - acetoxy - 5α - pregnan-3α-ol-11,20-done: 5α-pregnan-3α-ol-11,20-dione (1 g. 3 mmoles) was brominated in the manner described above. The total product from the reaction (1.38 g.) was refluxed with stirring with dry acetone (25 ml.) and anhydrous potassium acetate (2 g.). After four hours the reaction mixture was poured into chloroform (100 ml.), washed with water (3× 50 ml.), dried (Na$_2$SO$_4$) and evaporated to a white froth (1.19 g.). Preparative thin-layer chromatography afforded 21-acetoxy-5α-pregnan-3α-ol-11,20-dione (634 mg.) as a white froth which on crystallization from acetone/ether gave colorless needles, M.P. 177–180°, [α]$_D$ +102.5° (c. 0.95, CHCl$_3$). Gas-liquid chromatography confirmed the identity of this material.

EXAMPLE 23

21-acetoxy-5α-pregnan-3α-ol-11,20-dione

5α-pregnan-3α-ol-11,20-dione (5 g., 15.0 mmoles) in stirred methanol (35 ml.) at 0° was treated with 5 drops of a 50% w./v. solution of hydrogen bromide in glacial acetic acid. After several minutes, bromine (0.95 ml., 2.815 g. 17.6 mmoles) in methanol (22.5 ml.) was added portionwise over ca. 10 minutes. The solution was left stirring until the colour disappeared and then poured into water. The product was isolated by filtration, washed with water and dried in vacuo at 40° for five hours. Final drying was over phosphorus pentoxide in a desiccator (overnight). Yield: approximately quantitative.

The crude bromo-intermediate was dissolved in acetone (100 ml., dried over potassium carbonate) and refluxed in the presence of potassium acetate (10 g.) for four hours.

The reaction mixture was poured into water (1 l.) and extracted with ether (300 ml. and 250 ml. The ether was dried over anhydrous magnesium sulphate, filtered and evaporated under reduced pressure.

The residual foam was recrystallized from acetone-petroleum ether to give 21-acetoxy-5α-pregnan-3α-ol-11,20-dione as white needles. Yield, 63%, M.P. 173–175°, [α]$_D$ +109° (c. 1.0, CHCl$_3$).

EXAMPLE 24

21-propionyloxy-5α-pregnan-3α-ol-11,20-dione

5α-pregnan-3α-ol-11,20-dione (2 g., 6 mmoles) in methanol (14 ml.) at 30° was terated with acetyl chloride (2 drops). The solution was stirred for two minutes and was treated dropwise with bromine (0.38 ml., 7 mmoles) in methanol (9 ml.) in the manner described above. The reaction mixture was poured into stirred water (250 ml.). The product was isolated, washed and dried at the pump and redried over phosphorus pentoxide in vacuo to afford a white powder (2.49 g.). This was refluxed with propionic acid (11.1 ml., 0.15 mmoles) and triethylamine (7.25 ml., 0.1 moles) in dry acetone (60 ml.). After five hours the solution was poured into chloroform (300 ml.), washed with aqueous potassium hydrogen carbonate (2× 200 ml.) and with water (2× 200 ml.), dried (Na$_2$SO$_4$) and evaporated to a white froth (2.59 g.). Preparative thin-layer chromatography afforded material which on recrystallisation from chloroform/ether/hexane gave 21-propionyloxy-5α-pregnan-3α-ol-11,20-dione (589 mg.) as colorless irregular prisms, M.P. 159–170°, [α]$_D$ +99° (c. 0.92, CHCl$_3$). Found (percent): C, 70.5; H, 8.9. C$_{24}$H$_{36}$O$_5$·¼H$_2$O requires (percent): C, 70.45; H, 9.0.)

EXAMPLE 25

21-isobutyryloxy-5α-pregnan-3α-ol-11,20-dione

5α - pregnan - 3α-ol-11,20-dione (2 g., 6 mmoles) in methanol (14 ml.) at 30° was treated with acetyl chloride (2 drops). The solution was stirred for two minutes before being treated dropwise with bromine (0.38 ml., 7 mmoles) in methanol (9 ml.) in the manner described above. When the reaction was complete the solution was poured into stirred water (250 ml.). The product was isolated, washed and dried at the pump. A final drying over phosphorus pentoxide in vacuo afforded a white powder (2.5 g.). This was refluxed with isobutyric acid (14.1 ml., 0.15 moles) and triethylamine (7.25 ml., 0.10 moles) in dry acetone (60 ml.). After four hours the solution was poured into chloroform (300 ml.), washed with aqueous potassium hydrogen carbonate (2× 200 ml.) with water (2× 200 ml.), dried ($Na_2SO_4$) and evaporated to a white froth (2.54 g.). Preparative thin-layer chromatography afforded 21 - isobutyryloxy-5α-pregnan-3α-ol-11,20-dione (1.45 g.) as a white froth, $[α]_D$ +93.5° (c.0.66, $CHCl_3$). (Found (percent): C, 70.4; H, 8.8; $C_{25}H_{38}O_5 \cdot \frac{1}{2}H_2O$ requires (percent): C, 70.25; H, 9.2.)

EXAMPLE 26

21-benzoyloxy-5α-pregnan-3-ol-11,20-dione

5α - pregnan - 3α - ol-11,20-dione (2 g., 6 mmoles) in methanol (14 ml.) was treated with acetyl chloride (2 drops) and bromine (0.38 ml., 7 mmoles) as described above. Isolation of the crude bromination product in the usual manner afforded a white powder (2.498 g.). This was refluxed with benzoic acid (18.3 g., 0.15 moles) and triethylamine (7.25 ml., 0.1 moles in dry acetone (100 ml.). After five hours the solution was poured into chloroform (500 ml.), washed with aqueous sodium hydrogen carbonate (2× 200 ml.) and with water (3× 200 ml.), dried ($Na_2SO_4$) and evaporated to a white froth. Preparative thin-layer chromatography afforded 21-benzoyloxy - 5α - pregnan - 3α-ol-11,20-dione (1.27 g.) as a white froth, $[α]_D$ +104° (c. 0.65, $CHCl_3$). (Found (percent): C. 72.6; H, 7.7. $C_{28}H_3 O_5 \cdot \frac{1}{2}H_2O$ requires (percent): C, 72.85; H, 8.05.)

EXAMPLE 27

21-isobutyryloxy-5α-pregnan-3α-ol-11,20-dione 3-nitrate (i) Fuming nitric acid (1.3 ml.) was added to stirred acetic anhydride (5 ml.). The solution was cooled to —5° and 21-acetoxy-5α-pregnan-3α-ol-11,20-dione (500 mg. 1.28 mmoles) in chloroform (2.5 ml.) was added. The resulting solution was stirred at —5° for an hour before being poured into dilute aqueous sodium hydroxide (100 ml.), extracted with chloroform (2× 75 ml.) and the extract washed with aqueous sodium bicarbonate (50 ml.), with water (3× 50 ml.), dried ($Na_2SO_4$) and evaporated to a gum (527 mg.). Crystallization from ether/acetone afforded 21-acetoxy-5α-pregnan-3α-ol-11,20-dione 3-nitrate (386 mg.) as colorless needles, M.P. 147–149°, $[α]_D$ +103° (c. 1.06, $CHCl_3$). (Found (percent): C, 63.6; H, 7.5; N, 3.1, $C_{23}H_{33}NO_7$ requires (percent): 63.45; H, 7.65; N, 3.2.)

(ii) 5α - pregna - 3α,21 - diol - 11,20-dione 3-nitrate: (a) 21 - acetoxy - 5α - pregnan - 3α-ol-11,20-dione 3-nitrate (837 mg., 2 mmoles) in ethanol (42 mg.) and tetrahydrofuran (42 ml.) was stirred with 10% aqueous potassium hydrogen carbonate (4 ml.) and 2 N aqueous sodium hydroxide (2 ml.). After three hours glacial acetic acid (1 ml.) was added, the solution was poured into water (400 ml.) and extracted with chloroform (3× 120 ml.). The extracts were washed with water (2× 50 ml.), dried ($MgSO_4$) and evaporated to a froth. Preparative thin-layer chromatography afforded pure material which on recrystallization from ether/acetone gave 5α-pregna-3α,21 - diol - 11,20-dione 3-nitrate (219 mg.) as colorless irregular prisms, M.P. 172–176°, $[α]_D$ +91° (c. 0.97, $CHCl_3$). (Found (percent): C, 63.9; H, 7.8; N, 3.5. $C_{21}H_{31}NO_6$ required (percent): C, 64.1; H, 7.95; N, 3.55.)

(b) 21-acetoxy - 5α - pregnan-3α-ol-11,20-dione (5 g., 13.3 moles in chloroform (25 ml.) was added to a stirred solution of fuming nitric acid (13 ml.) in acetic anhydride (50 ml.) at —5°. The reaction mixture was stirred at —5° for an hour, poured into stirred aqueous sodium hydroxide (1 l.) and extracted with chloroform (2× 200 ml.). The extract was washed with aqueous sodium hydrogen carbonate (100 ml.) and with water 2× 100 ml.), dried ($Na_2SO_4$) and evaporated to a white froth. This was dissolved in methanol (500 ml.), the solution flushed with nitrogen and stirred with 10% aqueous potassium hydrogen carbonate (17.5 ml.) for four hours. Glacial acetic acid (3 ml.) was added, the solution evaporated to small bulk, poured into water (1 l.) and extracted with chloroform (2× 200 ml.). The extract was washed with water (2× 100 ml.), dried ($Na_2SO_4$) and evaporated to a white froth. Crystallisation from acetone/ether gave 5α-pregna-3α,21-diol-11,20-dione 3-nitrate (4.31 g.) as colorless irregular prisms, M.P. 174–181°.

(iii) 21-isobutyryloxy - 5α - pregnan-3α-ol-11,20-dione 3-nitrate: 5α-pregna-3α,21-diol-11,20-dione 3-nitrate 2.0 g., 5.08 mmoles) in dry pyridine (20 ml.) was treated with isobutyryl chloride (2 ml.). The pink solution was allowed to stand at room temperature for 20 hours before being poured into stirred water and acidified with dilute hydrochloric acid. The product was isolated, washed thoroughly with water and dried at the pump. Recrystallization from acetone/hexane afforded 21-isobutyryloxy-5α-pregnan-3α-ol-11,20-dione 3-nitrate (1.01 g.) as colorless needles, M.P. 167–169°, $[α]_D$ +97.5° (c. 1.48, $CHCl_3$). Found (percent): C, 64.5; H, 7.8; N, 3.2. $C_{25}H_{37}NO_7$ requires (percent): C, 64.8; H, 8.05; N, 3.0.)

(iv) 21-isobutyryloxy - 5α - pregnen-3α-ol-11,20-dione; 21-isobutyryloxy-5α-pregnan - 3α - ol-11,20-dione 3-nitrate (1.35 g., 2.91 mmoles) in glacial acetic acid (35 ml.) was stirred for an hour at room temperature with zinc powder (4 g.). The zinc was removed, washed with hot chloroform (200 ml.) and the combined washings and filtrates were washed with water (4× 100 ml.) dried ($Na_2SO_4$) and evaporated to a white froth. Preparative thin-layer chromatography afforded 21-isobutyryloxy-5α-pregnan-3α-ol-11,20-dione as a white froth, $[α]_D$ +97.5° (c. 1.05, $CHCl_3$). Analytical thin-layer chromatography and gas-liquid chromatography indicated that this materical was identical with a sample prepared by the method described in Example 25.

EXAMPLE 28

3α-hydroxy-5α-pregn-16-ene-11,20-dione and 5α-pregna-2,16-diene-11,20-dione

A stirred mixture of 3β-toluene-p-sulphonyloxy-5α-pregn-16-ene-11,20-dione (627 g.), potassium acetate (918 g.), dimethylformamide (4.25 l.) and water (425 ml.) was heated on the steam bath for 4 hrs. Most of the dimethylformamide was removed under reduced pressure and water was added to the residue with stirring. The solid (420 g.) was collected, washed and dried at 40° in vacuo. This material in peroxide free dioxan (7 l.) was flushed with nitrogen and a solution of potassium hydroxide (200 g.) in water (2 l.) was added. The mixture was stirred and heated at 50–60° for 7 hrs. and then left at room temperature overnight. Acetic acid (50 ml.) was added and the precipitated solid filtered off, washed with water and dried. The dry solid was heated under reflux with benzene (2 l.) for 2 hrs. the mixture cooled and filtered to give 3α-hydroxy-5α-pregn-16-ene-11,20 (215 g.).

Benzene extracts from several similar experiments were combined and evaporated. The crude solid was redissolved in hot benzene and petroleum (B.P. 60–80°) was added until the solution was just clear at ambient temperature (an insoluble residue was removed by filtration at this stage). The clear solution was passed down an alumina column (Woelm alumina, activity grade I) previously prepared with benzene-petroleum (B.P. 60–80°) in the ratio 6:4. Elution with the same solvent gave the diene. Elution was terminated when thin layer chromatography indicated the presence of slower running components in the eluate. The combined fractions were evaporated and twice crystallized from benzene-petroleum (B.P. 60–80°) to give 5α-pregna-2,16-diene-11,20-dione as colorless crystals, M.P. 176–177°, [α] +159° (c., 1.0 in CHCl$_3$), λ$_{max.}$ (EtOH) 233.5 nm. (ε 9150). (Found (percent): C, 80.5; H, 8.9. C$_{21}$H$_{28}$O$_2$ requires (percent): C, 80.8; H, 9.0.)

EXAMPLE 29

5α-pregna-3α,21-diol-11,20-dione 21-hemisuccinate

5α-pregna-3α,21-diol-11,20-dione 3-nitrate 21-hemisuccinate (1.03 g., 2.09 mmoles) and zinc powder (3 g.) were stirred with acetic acid (25 ml.) for 90 minutes. The zinc was removed, washed with chloroform (100 ml.), 2 N aqueous hydrochloric acid (200 ml.) and chloroform (100 ml.). The combined filtrates were equilibrated and the organic phase was washed with water (3× 100 ml.), dried (Na$_2$SO$_4$) and evaporated to a white froth. Crystallization from benzene/hexane/chloroform gave 5α-pregna-3α,21-diol-11,20-dione-21-hemisuccinate (800 mg.) as colorless needles, M.P. 166–168°, [α]$_D$ +90.5° (c. 1.32 in CHCl$_3$). (Found (percent): C, 66.9; H, 8.0. C$_{25}$H$_{36}$O$_7$ requires (percent): C, 66.95; H, 8.1.)

The starting material for this preparation was obtained from 5α-pregna-3α,21-diol-11,20-dione 3-nitrate [see Example 27(ii)] as described below:

5α-pregna-3α,21-diol-11,20-dione 3-nitrate (2 g., 5.08 mmoles) and succinic anhydride (2 g., 20 mmoles) in dry pyridine (20 ml.) were allowed to stand at room temperature for 18 hours. The solution was poured into stirred water (300 ml.) which was then acidified. After two hours, the precipitate was collected, washed well with water and dried. Recrystallization from benzene/hexane gave 5α-pregna-3α,21-diol-11,20-dione 3-nitrate 21-hemisuccinate (1.51 g.) as colorless micro-needles, M.P. 160–163°, [α]$_D$ +89.5° (c. 1.14, CHCl$_3$). Found (percent): C, 60.8; H, 7.3; N, 2.6. C$_{25}$H$_{35}$NO$_9$ requires (percent): C, 60.8; H, 7.15; N, 2.85.)

EXAMPLE 30

0.03 g. of steroid I, finely divided in an air-attrition mill and having an approximate mean particle diameter of 5 μm., was mixed with 2 g. of Cremophor EL by mechanical agitation and heated to 70° in an atmosphere of nitrogen. Heating and agitation was continued until the steroid had dissolved. The solution was diluted with sterile distilled water containing 0.025 g. of sodium chloride to gain a final volume of 10 ml., and stirring continued until the solution was homogeneous.

EXAMPLE 31

0.035 g. of steroid I reduced in size as in Example 30 are mixed with 0.035 g. of steroid (R=CH$_3$CO—) reduced in size as for steroid I. The steroids are added to 10 ml. of a 20% w./v. solution of Cremophor EL containing 0.025 g. of sodium chloride and the mixture mechanically stirred for at least 24 hours. Any traces of insoluble residue are filtered off using a sintered glass filter.

EXAMPLE 32

13.5 g. of ground steroid I and 4.5 g. of steroid II (R=CH$_3$SO—) are mixed by mechanical agitation with 300.0 g. of Cremophor EL at 70° C. in an atmosphere of nitrogen. Heating and agitation are continued until the steroids have completely dissolved. The mixture is diluted with sterile distilled water containing 3.75 g. of sodium chloride to give a final volume of 1500 ml. Stirring is continued until the solution is homogeneous.

EXAMPLE 33

0.045 g. of steroid I and 0.015 g. of steroid II (R=CH$_3$CO—) are dissolved in 2 ml. of acetone at 20° C. The resultant solution is added to 1 g. of Cremophor EL at 20° C. and stirred until homogeneous. The acetone is removed by a vigorous stream of nitrogen. The solution is diluted with sterile distilled water containing 0.0125 g. of sodium chloride to give a final volume of 5 ml. Similar solutions were prepared using chloroform or methylene chloride in place of acetone.

EXAMPLE 34

0.09 g. of ground steroid I are mixed with 0.03 g. of ground steroid II (R=CH$_3$CO—) and this added to 2.0 g. of Tween 80. As in Example 33, the mixture is mechanically agitated at 70° C. in a stream of nitrogen until the steroids have dissolved. The mixture is diluted with sterile distilled water containing 0.025 g. of sodium chloride to give a final volume of 10 ml.

EXAMPLE 35

0.045 g. of steroid I and 0.015 g. of steroid II (R=(CH$_3$)$_2$CHCO—) are formulated as in Example 33. Similar solutions are obtained using steroid II wherein R=C$_6$H$_5$CO—, HO$_2$CCH$_2$CH$_2$CO— or C$_2$H$_5$—CO—.

EXAMPLE 36

0.045 g. of steroid I and 0.015 g. of steroid II (R=CH$_3$CO) are dissolved in 2 ml. of acetone at 20° C. The resulting solution is added to 1 g. of Tween 40 at 20° C. and stirred until homogeneous. The acetone is removed by a vigorous stream of nitrogen. The solution is diluted with sterile distilled water containing 0.025 g. of sodium chloride to give a final volume of 10 ml.

EXAMPLE 37

0.036 g. of ground steroid I are mixed with 0.012 g. of ground steroid II (R=CH$_3$CO). This is added to 0.8 g. of Tween 60. The mixture is mechanically agitated at 70° C. in a stream of nitrogen until the steroids are dissolved. The mixture is diluted with sterile distilled water containing 0.025 g. of sodium chloride to give a final volume of 10 ml.

EXAMPLE 38

16 mg. of steroid I and 4 mg. of steroid II (R=CH$_3$CO)

were dissolved in 0.2 ml. of acetone, and 0.2 ml. of Cremophor EL was mixed with this solution. The acetone was removed by passing a stream of nitrogen through the mixture. The resulting solution was mixed with 0.8 ml. of sterile water.

EXAMPLE 39

0.135 gram steroid I and 0.045 gram of steroid II, (R=CH$_3$CO), are dissolved in 2 mls. of acetone at 20° C. The resulting solution is added to 3 grams of Cremophor EL at 20° C. and stirred until homogeneous. The acetone is removed by a vigorous stream of nitrogen. The solution is diluted with sterile distilled water containing 0.025 gram of sodium chloride to give a final volume of 10 mls.

EXAMPLE 40

0.045 gram of ground steroid I are mixed with 0.012 gram of ground steroid II, (R=CH$_3$CO), and the mixture added to 1 gram of Cremophor EL. The mixture is mechanically agitated at 70° C. in a stream of nitrogen until the steroids have dissolved. The mixture is diluted with sterile distilled water containing 0.025 gram of sodium chloride to give a final volume of 10 mls.

We claim:
1. An anaesthetic composition suitable for use by parenteral administration comprising 3α-hydroxy-5α-pregnane-11,20-dione in solution in an aqueous medium in an amount of at least 1 mg./ml. of said medium, said medi- um also containing at least one further steroid of the formula

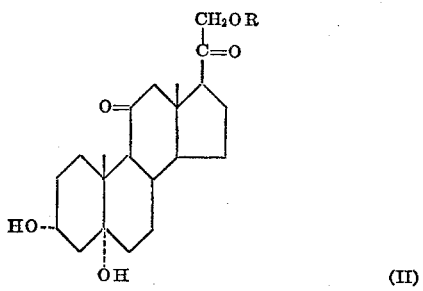

(II)

wherein R is selected from the group consisting of a lower alkanoyl group, a hemisuccinyl group and a benzoyl group; said further steroid increasing the solubility of said first-mentioned steroid in said medium; and said medium also containing at least 1% by weight of a parenterally acceptable non-ionic surface active agent having an HLB value of at least 9.

2. A composition as claimed in claim 1 wherein the substituent R in the compound of Formula II represents an alkanoyl group containing from 2 to 4 carbon atoms.

3. A composition as claimed in claim 1 wherein the compound of Formula II is 21-acetoxy-3α-hydroxy-5α-pregnane-11,20-dione.

4. A composition as claimed in claim 1 wherein the compound of Formula II is 3α-hydroxy-21-propionyloxy-5α-pregnane-11,20-dione.

5. A composition as claimed in claim 1 wherein the compound of Formula II is 21-iso-butyryloxy-3α-hydroxy-5α-pregnane-11,20-dione.

6. A composition as claimed in claim 1 wherein the compound of Formula II is 3α,21-dihydroxy-5α-pregnane-11,20-dione 21-hemisuccinate.

7. A composition as claimed in claim 1 wherein the compound of Formula II is 21-benzoyloxy-3α-hydroxy-5α-pregnane-11,20-dione.

8. A composition as claimed in claim 1 wherein up to 50% by weight of the total steroid present is a compound of Formula II.

9. A composition as claimed in claim 8 wherein up to 40% by weight of the total steroid present is a compound of Formula II.

10. A composition as claimed in claim 1 wherein at least 5% by weight of the total steroid present is a compound of Formula II.

11. A composition as claimed in claim 10 wherein at least 10% by weight of the total steroid present is a compound of Formula II.

12. A composition as claimed in claim 10 wherein not more than 30% by weight of the total steroid present is a compound of Formula II.

13. A composition as claimed in claim 11 in which the total steroid content comprises about 75% by weight of 3α-hydroxy-5α-pregnane-11,20-dione and about 25% by weight of a compound of Formula II.

14. A composition as claimed in claim 1 which contains at least 2 mg./ml. of 3α-hydroxy-5α-pregnane-11,20-dione.

15. A composition as claimed in claim 14 which contains at least 4 mg./ml. of 3α-hydroxy-5α-pregnane-11,20-dione.

16. A composition as claimed in claim 1 which contains up to 50 mg./ml. of total steroid.

17. A composition as claimed in claim 16 which contains less than 30 mg./ml. of total steroid.

18. A composition as claimed in claim 16 which contains less than 20 mg./ml. of total steroid.

19. A composition as claimed in claim 1 which contains about 9 mg./ml. of 3α-hydroxy-5α-pregnane-11,20-dione and about 3 mg./ml. of a compound of Formula II.

20. A composition as claimed in claim 1 comprising at least 1 mg./ml. of 3α-hydroxy-5α-pregnane-11,20-dione said solution containing about 20% by weight of a polyoxyethylated castor oil containing about 40 ethylene oxide units per triglyceride unit.

21. A composition as claimed in claim 1 comprising at least 1 mg./ml. of 3α-hydroxy-5α-pregnane-11,20-dione said solution containing about 20% by weight of polyoxyethylene sorbitan monooleate containing about 20 ethylene oxide units.

22. A composition as claimed in claim 1 comprising about 9 mg./ml. of 3α-hydroxy-5α-pregnane-11,20-dione and about 3 mg./ml. of 21-acetoxy-3α-hydroxy-5α-pregnane-11,20-dione said solution containing about 20% by weight of a polyoxyethylated castor oil containing about 40 ethylene oxide units per triglyceride unit.

23. A composition as claimed in claim 1 comprising about 9 mg./ml. of 3α-hydroxy-5α-pregnane-11,20-dione and about 3 mg./ml. of 2-acetoxy-3α-hydroxy-5α-pregnane-11,20-dione said solution containing about 20% by weight of polyoxyethylene sorbitan monooleate containing about 20 ethylene oxide units.

24. A composition as claimed in claim 1 wherein the surface active agent has an HLB value of from 9–18.

25. A composition as claimed in claim 1 wherein the surface active agent has an HLB value of at least 12.

26. A composition as claimed in claim 1 wherein the surface active agent has an HLB value of not greater than 15.

27. A composition as claimed in claim 1 wherein the surface active agent is selected from the group consisting of a polyoxyethylated castor oil containing from 35–45 oxyethylene groups per triglyceride unit and a polyoxyethylated fatty acid ester containing from 12 to 18 carbon atoms of sorbitan or mannitan.

28. A composition as claimed in claim 1 wherein the surface active agent is selected from the group consisting of a polyoxyethylated castor oil containing about 40 ethylene oxide units per triglyceride unit, and polyoxyethylene sorbitan monooleate containing about 20 ethylene oxide units.

29. A composition as claimed in claim 1 wherein the surface active agent comprises polyoxyethylene sorbitan monostearate containing about 20 ethylene oxide units or polyoxyethylene sorbitan monopalmitate containing about 20 ethylene oxide units.

30. A composition as claimed in claim 1 which contains above 5% by weight of surface active agent based on the total volume of composition.

31. A composition as claimed in claim 30 which contains above 10% by weight of surface active agent based on the total volume of composition.

32. A composition as claimed in claim 30 which contains not more than 50% by weight of surface active agent based on the total volume of composition.

33. A composition as claimed in claim 32 which contains not more than 30% by weight of surface active agent based on the total volume of composition.

34. A composition as claimed in claim 30 which contains about 20% by weight of surface active agent, based on the total volume of composition.

35. An anaesthetic composition suitable for use by parenteral administration comprising 3α-hydroxy-5α-pregnane-11,20-dione in solution in an aqueous medium in an amount of at least 2 mg./ml. of said medium, said medium also containing 21-acetoxy-3α-hydroxy-5α-pregnane-11,20-dione, said last mentioned steroid increasing the solubility of said first mentioned steroid in said medium and being present in an amount of from 10–50% by weight of total steroid present in said medium, said medium further containing from 5–30% by weight of a parenterally acceptable non-ionic surface active agent having an HLB value of from 9–18.

36. A method of inducing anaesthesia in an individual, man or animal, to be anaesthetised, comprising parenterally administering to the individual an aqueous solution containing at least 1 mg./ml. of 3α-hydroxy-5α-pregnane- 11,20-dione in an aqueous solution containing a non-ionic surface active agent having the effect of solubilising said 3α-hydroxy-5α-pregnane-11,20-dione, said solution using as solubility promoting agent a steroid of the formula

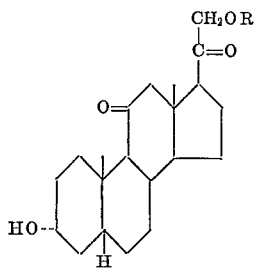
(II)

wherein R is selected from the group consisting of a lower alkanoyl group, a hemisuccinyl group and a benzoyl group.

37. A method as claimed in claim 36 wherein the said steroid of Formula II is 21-acetoxy-3α-hydroxy-5α-pregnane-11,20-dione.

References Cited

UNITED STATES PATENTS

| | | | |
|---|---|---|---|
| 3,337,400 | 8/1967 | Smith | 424—240 |
| 3,180,797 | 4/1965 | Cachillo et al. | 424—240 X |
| 2,880,138 | 2/1959 | Johnson | 424—240 X |

FOREIGN PATENTS

| | | |
|---|---|---|
| 6,555 | 2/1969 | France. |
| 834,913 | 5/1960 | Great Britain. |
| 941,694 | 12/1963 | Great Britain. |

OTHER REFERENCES

Kappas et al.: A.M.A. Arch. Intern. Med. 105; 701–708, May 1960, "Fever Producing Steroids of Endogenous Origin in Man."

Atkinson et al.: J. Med. Chem. 8; 426–432 (1965), "Action of Some Steroids on the Central Nervous System of the Mouse II Pharmacology."

Campbell et al.: Brit. J. Anabsth. 43; 14-24 (1971), A Preliminary Clinical Study of CT 1341—A Steroid Anaesthetic Agent.

Child et al.: Brit. J. Anabsth. 43; 2–13 (1971), The Pharmacological Properties in Animals of CT 1341—A New Steroid Anaesthetic Agent.

Clarke et al.: Brit. J. Anabsth. 43; 947–952 (1971), Clinical Studies of Induction Agents XXXIX CT 1341—A New Steroid Anaesthetic.

Benke et al.: Postgraduate Medical Journal 48(2), 120–123, June 1972, Aethesin and Hydroxydione: Comparative Laboratory and Clinical Investigations.

SHEP K. ROSE, Primary Examiner